(No Model.)

H. J. WINTHERLICH.
AIR SCALE.

No. 599,378. Patented Feb. 22, 1898.

Witnesses:
Albert Popkins
Carrie L. Acker

Inventor
H. J. Wintherlich

UNITED STATES PATENT OFFICE.

HANS J. WINTHERLICH, OF OMAHA, NEBRASKA, ASSIGNOR TO THE OMAHA AIR SCALE COMPANY, OF SAME PLACE.

AIR-SCALE.

SPECIFICATION forming part of Letters Patent No. 599,378, dated February 22, 1898.

Application filed October 31, 1896. Serial No. 610,759. (No model.)

*To all whom it may concern:*

Be it known that I, HANS JULIUS WINTHERLICH, a citizen of the United States, residing at Omaha, in the county of Douglas and State of Nebraska, have invented certain new and useful Improvements in Air-Scales; and I do hereby declare the following to be a full, clear, and exact description of the invention, such as will enable others skilled in the art to which it appertains to make and use the same.

My invention relates to air-scales or mechanism for indicating the presence of impurities or noxious gases in the atmosphere of an apartment through changes in the specific gravity of the air surrounding the scale or instrument caused by the presence of the impurities.

It is a well-known law of physics that a body when weighed in air or other fluid loses that portion of its weight represented by a corresponding bulk of the fluid by which it is surrounded. I utilize this principle in carrying out the present invention, and my primary purpose is to provide an apparatus which will be highly sensitive to variations in the specific gravity in the atmosphere and which will indicate such changes either visually or through any suitable audible alarm or otherwise.

Figure 1:
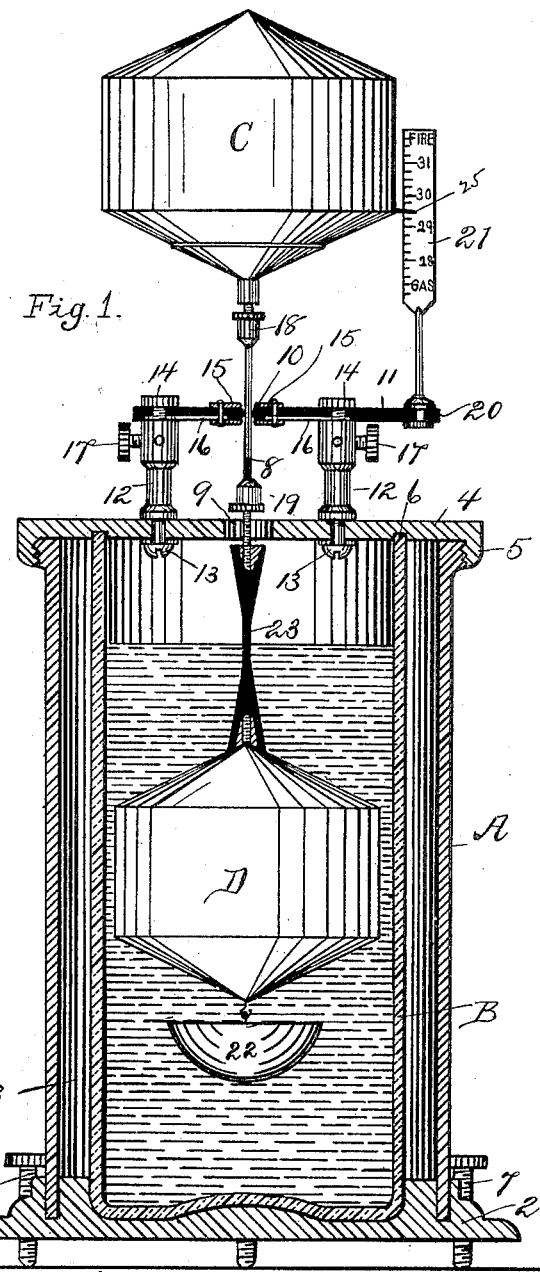
Figure 2:
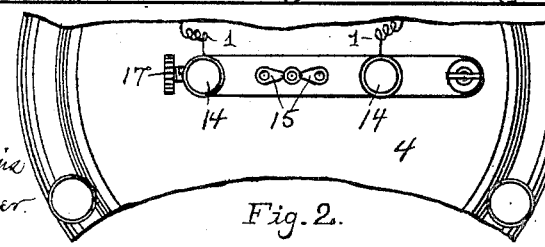

In the accompanying drawings, Figure 1 is a vertical sectional view of an apparatus embodying my invention, and Fig. 2 is a plan view of the same partly broken away and with the upper balloon removed.

A indicates a cylindrical casing secured to a base 2 and surrounding an inner concentric cylinder or jar B, resting on the base 2. An air-space 3 is thus left between the two cylinders. A cap or cover 4, common to both of the cylinders, is provided with an internally-threaded depending flange 5, engaging threads on the outer cylinder A, and with an annular groove or recess 6 to receive the top edge of the cylinder B. The base 2 is preferably provided with adjustable screws 7, serving as feet for the purpose of leveling the apparatus.

C and D indicate two balloons or hollow floating bodies, preferably made of aluminium. These balloons are secured one to each end of a thin metallic rod 8, said rod extending through an opening 9, formed centrally in the cover 4, and an opening 10, formed in a bar 11, of hard rubber or other non-conducting material, supported horizontally above the cover 4 by vertical supports 12, which latter are secured to the cover by screws 14. The bar 11 is provided on either side of its central opening 10 with contact-points 15 of conducting material, said points being electrically connected, by conductors 16, with binding-posts 17, which may be connected, by suitable wire conductors 1, with an alarm device.

18 and 19 indicate conical nuts arranged on the rod 8 and adapted to bridge the space between the contacts 15, as will be further explained.

The bar 11 projects laterally beyond one of the supports 12, and to its outer end 20 is secured an indicator or gage 21, having any proper designations in words or figures.

22 indicates a weight suspended from the lower balloon D, and 23 is a resistance device arranged on the rod 8 above the lower balloon D and having the general contour of an hour-glass, with its ends 24 of cup shape.

I will now explain the operation of the apparatus constructed as above described.

As illustrated in Fig. 1, the lower balloon D is inserted within the cylinder B, which latter contains sufficient water or other fluid to permit the submerging of the balloon. The upper balloon C is suspended in the air from the upper end of the rod 8, and to maintain an equilibrium of the balloons I attach the weight 22 to the balloon D. This equilibrium will be maintained so long as the air surrounding the upper balloon remains unchanged. If, however, by reason of the escape of illuminating-gas into the room where the instrument is located or from other causes the upper balloon becomes surrounded by gases lighter than the atmosphere, the balloon C will accordingly fall, forcing down the lower balloon D and indicating, by means of a pointer 25, on the indicator 21 by any predetermined scale.

The utility of what I term the "resistance" device may be explained as follows: When the upper balloon C becomes heavier by reason of a decrease in the specific gravity of the air or gas surrounding it, it becomes necessary in order to effect a registration or indication of the change for the lower balloon to displace a quantity of fluid (in which it floats) corresponding to the increased weight of the balloon C. As this displacement could only be effected by the lowering of the rod 8 in the fluid, (the balloon D being already entirely submerged,) thus requiring a rod of undue length, I provide the device 23, which comprises two cones joined at their apices and serving to insure an appreciable displacement of fluid with a limited movement.

As has been suggested above, the apparatus, through the conical nuts and contact-points, is adapted to close an electric circuit to any suitable alarm devices to give notice of undue changes in the atmosphere.

My improved apparatus is adapted for use in various ways. It may be used, as above suggested, as a means for controlling the ventilation of rooms, halls, churches, &c., the nuts 18 and 19 being adjusted to close the electric circuit at any predetermined condition of the air.

Again, the instrument might be placed on a bracket in the room of a hotel, and by connecting it by suitable means with a push-button of an annunciator any abnormal condition caused by escaping gas, smoke, or fire could be detected by the sounding of the alarm.

The apparatus is also well adapted for use in mines to detect the presence of fire-damp or other impurities in the atmosphere.

Having thus described my invention, what I desire to claim and secure by Letters Patent is—

1. In an air-scale, the combination with the base, the cylindrical casing, the concentric cylinder or jar and the cover, of the supports secured to said cover, the insulating-bar secured to said supports, having a central opening, the contact-points secured to said bar and the electrical conductors connected therewith, the vertically-movable rod, the balloons at the upper and lower ends thereof, the conical nuts secured to said rod, and the weight connected with the lower balloon, substantially as described.

2. In an air-scale, the combination with the base, the cylindrical casing, the concentric cylinder or jar, the cover, the supports secured thereto, the insulating-bar having a central opening secured to said supports, the contact-points and the electrical conductors, of the vertically-movable rod, the balloons at the upper and lower ends, the conical nuts on said rod, the double conical resistance-bar on said rod, and the weight at the end of the lower balloon, substantially as described.

3. In an air-scale, the combination with the base, the casing secured thereto, the inner concentric cylinder, the cover, the supports secured thereto, the insulating-bar secured to said supports, the contact-pieces, the conductors connected therewith, and the set-screws passing through the base, of the vertically-movable rod, the balloons at the ends, the conical nuts, the double conical resistance device, the weight secured to the lower balloon, the arm at the end of the insulating-bar provided with a gage and the pointer secured to the upper balloon, substantially as described.

In testimony whereof I have signed this specification in the presence of two subscribing witnesses.

HANS J. WINTHERLICH.

Witnesses:
CHAS. KAUFMANN,
E. F. AUGUSTAT.